United States Patent [19]

Myers

[11] 3,949,709

[45] Apr. 13, 1976

[54] ANIMAL SPRAY MACHINE

[76] Inventor: John A. Myers, Rte. 1, Hardy, Iowa 50545

[22] Filed: Mar. 27, 1974

[21] Appl. No.: 455,186

[52] U.S. Cl. .............................................. 119/159
[51] Int. Cl.² ........................................ A01K 13/00
[58] Field of Search ............................ 119/159, 157

[56] References Cited
UNITED STATES PATENTS

| | | | |
|---|---|---|---|
| 2,238,872 | 4/1941 | Mather et al. | 119/159 |
| 2,456,197 | 12/1948 | Jensen | 119/157 |
| 2,595,781 | 5/1952 | Durham | 119/159 |
| 2,665,665 | 1/1954 | Jones | 119/159 |
| 3,421,480 | 1/1969 | Cole | 119/159 |
| 3,541,996 | 11/1970 | Brockelsby et al. | 119/159 |

*Primary Examiner*—Hugh R. Chamblee
*Attorney, Agent, or Firm*—Zarley, McKee, Thomte & Voorhees

[57] ABSTRACT

A frame having a passageway is movably mounted on retractable wheels. A removable tongue is connected to the frame for transporting the spray machine. A spray system is mounted on a spray arch having a plurality of nozzles along its length and the spray arch is provided with sleeves at the bottom ends of its legs for slidably engaging vertical posts in the frame whereby the spray arch may be selectively vertically adjusted. The posts are provided with horizontal sleeves slidably connected to horizontal members of the frame for horizontally adjusting the position of the spray arch. The spray for the spray system is supplied from a tank mounted on the frame which in turn is connected to a pressurized air tank. An actuating wand extends transversely across the passageway through the frame to be engaged by an animal and maintain contact with the animal along its entire length such that that the animal will be sprayed. The movement of the actuating arm causes the spray system to function when moved only parallel to the length of the passageway in one direction only. The passageway may be substantially enclosed by a cover being provided over the frame thereby providing inducement for animals to enter the passageway.

10 Claims, 6 Drawing Figures

U.S. Patent   April 13, 1976   3,949,709
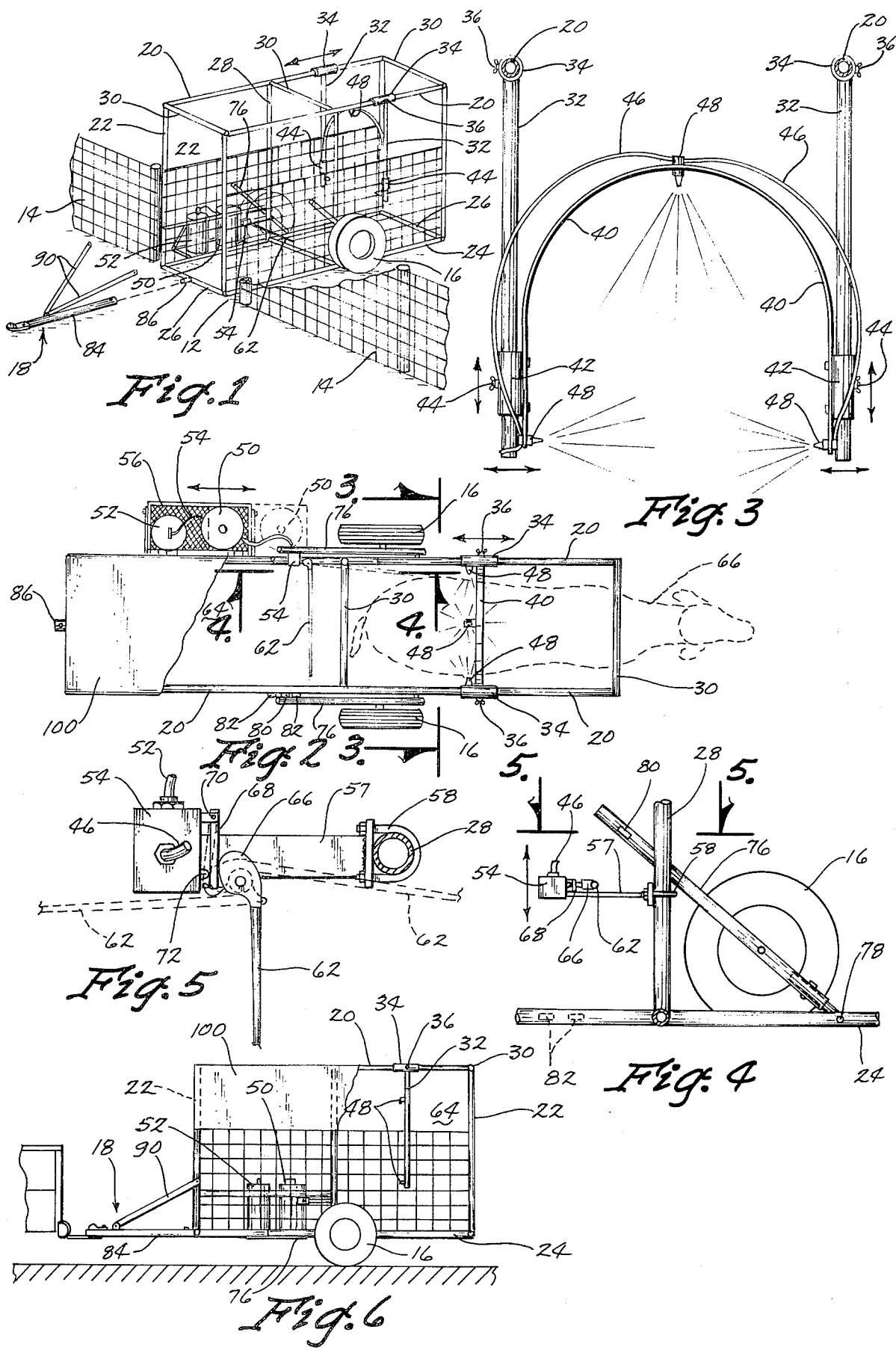

ANIMAL SPRAY MACHINE

It is important that animals be sprayed for insects and the like, and it has been found that with the machine of this invention it is possible to spray them wherever they may be since the machine is portable and may be easily moved to the animals. One desirable location is between the grazing field and an area such as a fenced-in pond wherein the spray machine is mounted in the gateway leading to the pond from the grazing field. The machine may be set up so that the animals are sprayed in either direction but preferably are sprayed in one direction only. The machine may be covered so that it provides a tunnel and they may see through to the opposite daylight end thereby enticing them to enter and once they are in it they will continue walking through particularly if they have moved into the passageway a substantial distance before the spray system is actuated.

The spray machine does not use electricity to operate the spray system but instead uses a compressed air system connected to a tank of spray fluid in turn connected to an arch over the passageway. The arch is readily adjustable vertically and horizontally to suit the particular animals being sprayed and their size.

The wheels are easily pivoted from a transport down position to a stationary use position wherein they are raised. The tongue is easily attached and removed when needed.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a fragmentary perspective view of the spray machine positioned in the gateway in a fence connecting a grazing field with a watering area.

FIG. 2 is a top plan view of the spray machine showing an animal in the passageway having actuated the spray system.

FIG. 3 is a cross sectional view taken along line 3 — 3 in FIG. 2.

FIG. 4 is a cross sectional view taken along line 4 — 4 in FIG. 2.

FIG. 5 is a cross sectional view taken along line 5 — 5 in FIG. 4; and

FIG. 6 is a side elevation view of the spray machine in its transport condition being hauled by a pickup truck.

The spray machine of this invention is referred to in FIG. 1 generally by the reference numeral 10 and is seen positioned in the gate 12 of a fence 14. The machine has been transported to this location on retractable wheels 16 and has been pulled by a detachable tongue 18.

The machine includes a frame having top horizontal members 20 connected by corner members 22 to bottom horizontal members 24. End members 26 interconnect the bottom horizontal members 24. Further rigidity to the frame is provided by vertical center members 28 extending between the top and bottom or horizontal frame members 20 and 24 and these members are connected at the top and bottom by horizontal members extending transversely 30 and 32.

A spray system is provided as best seen in FIG. 3 and includes vertical posts 32 having horizontal sleeves 34 at their upper ends slidably engaging the upper horizontal members 20. A setscrew 36 is provided for selectively locking the post at the desired horizontal position between the center vertical members 28 and the adjacent end of the frame.

An arch 40 is provided with sleeves 42 on the bottom ends of the legs of the arch and the sleeves are slidably mounted on the post 32 for selective vertical adjustment thereon. A thumbscrew 44 is provided for selectively locking the arch in a desired vertical position. A feed hose 46 connects to a plurality of spray nozzles 48. In FIG. 3 three spray nozzles are shown, one being at the top along the centerline of the passageway while the other two are at the bottom of the legs of the arch and all of the nozzles 48 are directed inwardly into the area through which the animal will pass. The feed line 46 extends outside of the frame to a spray tank 50 in turn connected to a pressurized air tank 52 by an air line 54. A platform 56 is provided on the frame for supporting the spray tank 50 and air tank 52. As seen in FIG. 2, the platform 56 is horizontally slidably adjustably connected to the frame for movement between the solid and dash line positions.

The spraying from the nozzles 48 is controlled by a valve 54 mounted on a bracket 57 in turn connected by a U-bolt 58 to the center vertical frame member 28. It is seen that it is selectively vertically adjustable on this vertical member 28 in FIG. 4. An actuating wand or arm 62 extends normally across a passageway 64 through the frame for engagement by an animal 66 passing through the passageway. The actuating arm 62 is provided with a cam 66 adapted to press against a pivotal plate 68 pivoted at 70. The free end of the plate 68 bears against a plunger 72 which opens and closes the valve 54. In the normal position of the actuating arm 62, as seen in FIG. 2, the valve is closed, however, when the actuating arm is pivoted to the right, as seen in FIG. 2, to the dashline position the plunger 72 is pushed inwardly and the valve 54 is opened allowing pressure in the tank 52 to force spray fluid from the tank 50 through the valve 54 to the spray nozzles 48 and onto the animal 66. It is seen that when the wand 62 is pivoted to a left-hand dashline position of FIG. 5 when the animal is returning in the opposite direction from that shown in FIG. 2, the shape of the cam will not cause the plate 68 to be pivoted inwardly against the plunger 72 and thus the valve will remain closed. It is understood that the cam surface could be changed to cause actuation of the plunger and the valve when the animal moves in either direction through the passageway. The actuating wand arm 62 is preferably made of flexible material such as fiberglass such that it will yield and avoid being broken by the animals passing through. The plunger 72 includes internally a spring which normally maintains a wand 62 in its transversely extending position such that it is yieldably allowed to pivot in either of the directions seen in FIG. 5 to a position parallel to the centerline of the passageway length.

The transport wheels 16 are carried on arms 76 pivotally connected at 78 to the bottom horizontal frame members 24. A tab 80 is provided on the outer free end of the arm 76 for locking engagement with corresponding tabs 82 on the horizontal frame member 24 when the arm 76 is pivoted to the down position of FIG. 6 when the wheels are in the transport position as seen in this figure. When the destination has been reached the arm is easily released to move the wheels to the stationary raised position of FIG. 4. The tongue 18 is comprised of a center tube member 84 for engagement with a male member 86 on the cross bottom frame member 26 as seen in FIG. 1 and a pin 88 is provided for locking the male member 86 to the tube 84. A pair of diverging brace members 90 extend outwardly and upwardly from the tube member 84 and are bolted to the opposite corner frame members 22.

A cover 100 is seen in FIG. 6 extending over the frame for substantially enclosing the passageway 64 so that a tunnel effect is provided by the passageway whereby animals will see light at the end of the passageway and be enticed to enter and pass on through.

In operation it is seen that the spray machine may be moved to any desired location through operation of the wheels 16 being moved to the transport position of FIG. 6 and the tongue 18 being utilized. When the destination is reached the tongue may be removed and the wheels may be lowered as seen in FIG. 1. The spray arch 40 is selectively positioned vertically and horizontally by adjustment of the setscrews 44 and 46. It is desirable that the animal enter the passageway 64 a substantial distance before the spray begins so that the animal will not have a tendency to back out of the passageway but instead will want to move on through and by doing so will be sprayed. As the animal passes through the passageway he will engage the wand actuator 62 at the forward part of his body in the leg area but high enough that he cannot step over it. The resistance offered will be so slight that the animal will hardly notice that anything is pressing against him. The wand will maintain contact with the animal along its entire length thereby causing the spray system to spray fluid onto the animal along its entire length. The spray arch may be appropriately adjusted relative to the wand actuator to accomplish the amount of spraying desired. It is also noted that the spray from the nozzles 48 is random in nature and thus covers a substantial area in all directions. As the animal returns from the watering area the actuator will be moved to the dashline position in FIG. 5 but due to the shape of the cam 66 the valve 54 will not be opened and no spraying of the animal will occur. It is understood that the cam 66 may be altered to cause spraying to occur when the wand is pivoted in either direction to a position parallel to the length of the passageway. As additional spray is required a full tank 50 may be easily connected to the hose lines 54 and 46 and the same is true when additional air pressure is required, a new tank 52 may be supplied or a portable air pump may be connected to the tank for renewing the pressure therein. In any event, no electricity is required and the spray machine is totally capable of being fully operated at any location. When it is desired to move the machine again it is merely necessary to reconnect the tongue 18 and lower the wheels 16 through operation of the lever 76 to the position of FIG. 6.

I claim:

1. A system for self spraying cattle comprising, a walk-through spray machine adapted to be located in a passageway connecting a feeding area with a watering area and said passageway being the only opening connecting said two areas otherwise separated by fencing whereby said cattle in the course of feeding and watering necessarily walk through said spray machine, said spray machine having a frame shaped to form a passageway therethrough, a spray means extending over said machine passageway for directing spray onto cattle passing through the machine, an actuator arm spring biased extending to a position laterally across said machine passageway and adapted to be deflected to a longitudinally extending position upon engagement by animals passing through and said arm being operatively connected to said spray means for turning said spray means on when said arm is in said longitudinally extending position and turning said spray means off when said arm is in said lateral position, and said machine passageway having a length being at least as long as the length of the cattle using the machine and said actuator arm being located far enough from the entrance end of said machine passageway that the cattle are substantially inside the machine before contact with the actuator arm is made thereby not frightening the cattle when said spray means is actuated, and said spray means is positioned between the actuator arm and the exit to said machine passageway such that the cattle are sprayed from front to rear as they pass through the machine and said spray means remains on as long as said cattle maintain engagement with said actuator arm to hold it in said longitudinal position.

2. The structure of claim 1 wherein said actuator arm is movable between open and closed positions for operating said spray means, said open position being parallel to the length of said machine passageway and said closed position being transversely of said machine passageway, said spray means being actuated when said actuator arm is in said open position and said arm is normally spring biased to said closed position.

3. The structure of claim 2 wherein said actuator arm is further defined as being in said open position only when extending in one direction parallel to the length of said frame and machine passageway and being inoperative when extending in the opposite direction whereby cattle 1 passing through said passageway will only be sprayed while going in one direction and not the other direction.

4. The structure of claim 1 wherein said frame includes vertical posts on opposite sides of said passageway and said spray means includes sleeves vertically movable on said posts for selective positioning of said spray system.

5. The structure of claim 4 wherein said spray system is further defined as including an inverted U-shaped tube having side and overhead spray nozzles directed into said passageway.

6. The structure of claim 4 wherein said frame includes horizontal frame members on opposite sides of said machine passageway, said vertical posts including horizontal sleeves on said horizontal frame members for adjustable horizontal movement.

7. The structure of claim 1 wherein said spray means includes an air pressurized spray source.

8. The structure of claim 7 wherein said frame is portable and includes wheels.

9. The structure of claim 8 wherein said wheels are retractable and said frame includes a removable tongue.

10. The structure of claim 1 wherein the top and sides of said frame around said passageway are substantially covered.

* * * * *